United States Patent
Terpstra et al.

(10) Patent No.: US 12,332,799 B2
(45) Date of Patent: Jun. 17, 2025

(54) SPECULATIVE REQUEST INDICATOR IN REQUEST MESSAGE

(71) Applicant: SiFive, Inc., San Mateo, CA (US)

(72) Inventors: Wesley Waylon Terpstra, San Mateo, CA (US); Eric Andrew Gouldey, Fort Collins, CO (US); Michael Klinglesmith, Chambéry (FR); Henry Cook, Berkeley, CA (US)

(73) Assignee: SiFive, Inc., Santa Clara, CA (US)

( * ) Notice: Subject to any disclaimer, the term of this patent is extended or adjusted under 35 U.S.C. 154(b) by 3 days.

(21) Appl. No.: 18/341,217

(22) Filed: Jun. 26, 2023

(65) Prior Publication Data

US 2024/0184703 A1    Jun. 6, 2024

Related U.S. Application Data

(60) Provisional application No. 63/429,327, filed on Dec. 1, 2022.

(51) Int. Cl.
*G06F 12/0862* (2016.01)
*G06F 12/0811* (2016.01)
*G06F 12/0815* (2016.01)

(52) U.S. Cl.
CPC ...... *G06F 12/0862* (2013.01); *G06F 12/0811* (2013.01); *G06F 12/0815* (2013.01)

(58) Field of Classification Search
CPC ............. G06F 12/0862; G06F 12/0811; G06F 12/0815; G06F 12/0806; G06F 12/084
See application file for complete search history.

(56) References Cited

U.S. PATENT DOCUMENTS

| 2018/0107505 A1* | 4/2018 | Cain, III | G06F 12/0862 |
| 2018/0157589 A1* | 6/2018 | Jayasena | G06F 12/0824 |

OTHER PUBLICATIONS

Stack Overflow, "Terminology: What's a mask and what's a flag" 2015, available: https://stackoverflow.com/questions/32013818/terminology-whats-a-mask-and-whats-a-flag.*

* cited by examiner

*Primary Examiner* — Tracy A Warren
(74) *Attorney, Agent, or Firm* — Kilpatrick Townsend & Stockton LLP

(57) ABSTRACT

A method and apparatus for a speculative request indicator is described. A method includes providing, for a cache hierarchy, a messaging protocol used for transfer operations among agents in the cache hierarchy, the messaging protocol indicating acceptable cache coherency states for a cache block indicated in a request message and providing, in the messaging protocol for selection by an agent, a speculative request indicator when sending the request message, wherein the speculative request indicator differentiates between a demand request and a speculative request with respect to the cache block.

21 Claims, 7 Drawing Sheets

SPECULATIVE REQUEST INDICATOR IN REQUEST MESSAGE

CROSS REFERENCE TO RELATED APPLICATION

This application claims priority to and the benefit of U.S. Provisional Patent Application Ser. No. 63/429,327 filed on Dec. 1, 2022, the entire disclosure of which is hereby incorporated by reference.

TECHNICAL FIELD

This disclosure relates generally to integrated circuits and, more specifically, to a messaging protocol which enables transmitting a request message with an indicator to note a speculative nature of a request.

BACKGROUND

A System-on-Chip (SoC) is an integrated circuit that includes multiple components connected to one another. The components may include, for example, processor cores, caches, cross bars, memory controllers, and memory-mapped devices. The components may be connected so that data can be transferred between them while adhering to a coherency policy, such as the MSI (modified, shared, invalid), MESI (modified, exclusive, shared, invalid), or MOESI (modified, owned, shared, exclusive, invalid) protocol. For example, the components can include agents that are connected to one another using TileLink, a chip-scale interconnect standard that provides multiple masters with coherent memory mapped access to memory and/or slave or server devices.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
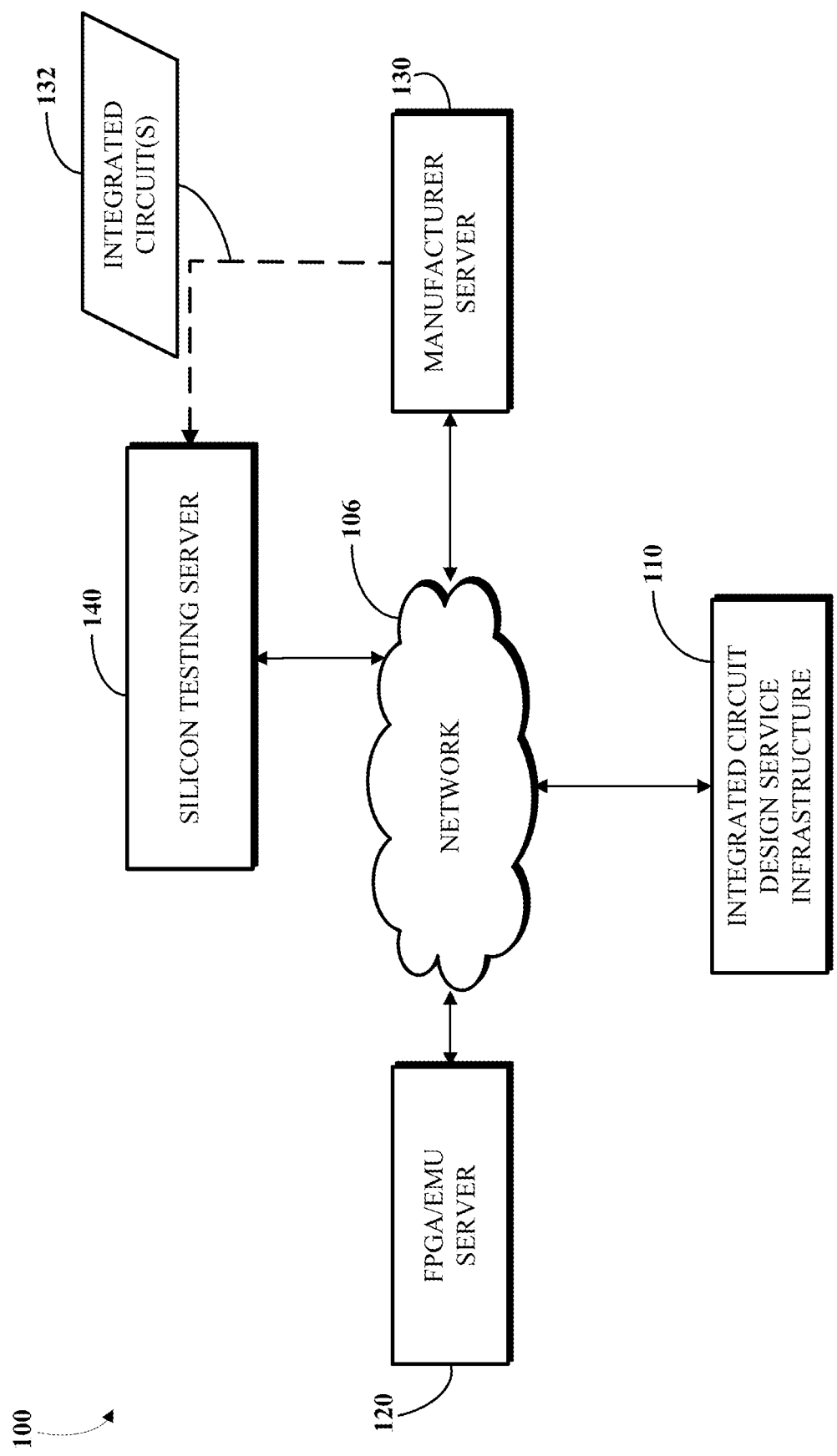
FIG. 1 is a block diagram of an example of a system for facilitating generation and manufacture of integrated circuits.

In an SoC, agents implemented by components, such as processor cores, caches, cross bars, memory controllers, and memory-mapped devices, may communicate with one another while adhering to a cache coherency policy (e.g., one of the MSI, MESI, or MOESI policies). For example, the agents may communicate with one another by initiating operations transmitted through a communications link, such as to transfer data stored in a cache block or change permissions for a cache block, through a cache hierarchy. A cache block is a contiguous set of memory addresses for which an agent can track cached copies of associated memory data. Thus, an agent may include logic and/or circuitry that enables access to shared address space by communicating messages.

Processors may execute demand requests and speculative requests. For example, demand requests may arise from actual load or instruction fetch operations whereas speculative requests may be based on branch prediction or other techniques which identify and prefetch instructions or data that may be needed in the near future. Prefetching or speculative execution may be done to reduce execution time and optimize processor performance. Agents receiving requests process each request, all things being equal, with near same efforts. In particular, cache coherency protocols do not provide a mechanism for differentiating between demand requests and speculative requests. That is, agents do not know the degree to which a request is speculative and therefore may spend the same amount of effort on all requests. However, as the term implies, speculative requests may not be correct. A miss may lead to performance degradation and inefficiency.

Implementations of cache coherency protocols described herein are designed to provide information or an indicator (collectively a "speculative request indicator") as to whether a request is a demand request or a speculative request. An agent receiving the request may use the speculative request indicator to intelligently prioritize a response for the request based on, for example, load, level of speculation of the request, and/or other factors. That is, the speculative request indicator may provide or enable the agent with a choice on how to respond to the request, which may alter or vary the amount of effort needed to process and respond to the request. In implementations, the agent may not service the request. That is, the speculative request indicator may enable the agent to legally respond with an invalid state for the request.

In some implementations, cache coherency protocols may use a limited set of cache coherency messages, where each message may be defined for or with a defined cache state(s). In implementations, the limited set of cache coherency messages may be referred to as demand cache coherency messages. In implementations, the speculative request indicator may be implemented by duplicating the demand cache coherency messages and adding a second limited set of cache coherency messages which include an invalid cache state for the respective defined cache state(s). The second limited set of cache coherency messages may be referred to as speculative cache coherency messages. This may enable an agent to select an appropriate cache coherency message from the demand cache coherency messages or the speculative cache coherency messages depending on whether the request is a demand request or a speculative request and the appropriate cache coherency state(s) required by the request.

In some implementations, cache coherency protocols may use a limited set of cache coherency messages, where each message has a defined cache state(s). In implementations, the speculative request indicator may be implemented by a flag or mask bit. This may enable an agent to select (by setting or clearing, for example) a bit to indicate that a request is a speculative request.

In some implementations, different types of components with associated agents may support tracking different kinds of metadata about the cache block which they are caching. This metadata, for example, may be the cache coherency state in the cache coherency policy. In accordance with the cache coherency policy, the different components and/or associated agents may each use different protocols or a different set of enumerated messages for indicating a specific cache coherency state for the cache block in question. For example, a first component and/or associated agent (client) that is an initiator for a transfer or data operation may send a request message that the cache block have an unshared and clean state. In an instance, this request message may not be compatible with the interconnect fabric, a second component and/or associated agent (server), or both. That is, the interconnect fabric, the second component and/or associated agent, or both may not have a corresponding message given the cache coherency policy. For example, the interconnect fabric, the second component and/or associated agent, or both may try to fit with a message that provides the closest available, e.g., a shared and clean state, or it may be non-operable and incompatible. Consequently, the use of different cache coherency policies and message protocols may make it difficult or hamper the ability to interoperate with an interconnect fabric or technology, for a component and/or associated agent to respond to the transfer request, or both.

Compatibility may be enabled by sending a cache coherency state request vector in a request message sent by a client to a server. A client (via an associated agent) is associated with the sending of requests and a server (via an associated agent) is associated with the providing of responses to the requests. The cache coherency state request vector may be used to specify what cache coherency states, one or more, clients expect cache blocks to be upon completion of an operation related to the demand or speculative request, such as for example, a data transfer operation. That is, the cache coherency state request vector may indicate to the server what cache coherency states are legal with respect to the cache block when responding to the request. The cache coherency state request vector is a bit-vector field, where each bit corresponds to a named or defined cache coherency state in a cache coherency policy, such as for example, a MOESI policy. A requested cache coherency state may be encoded in the cache coherency state request vector. In implementations, the encoding may differentiate between demand requests and speculative requests. The cache coherency state request vector may enable symmetric encoding for demand requests and speculative requests by having a defined bit for an invalid state which may be selected (set or cleared) depending on whether the request is a demand request or a speculative request. The cache coherency state request vector allows the server to comply with the expectations of a diverse set of clients on a client-by-client basis based solely on the cache coherency state request vector received from that client.

In some implementations, the cache coherency state request vector provides a cache coherency protocol where an agent may legally respond with an invalid state. In this instance, the request may include a cache coherency state request vector where a bit is selected for an invalid state due to the request being a speculative request. The described cache coherency protocol may therefore provide a systematic and uniform method for handling speculative request processing.

In implementations, the cache coherency state request vector provides a cache coherency protocol where a requester can select one or more cache coherency states for a legal response in contrast to having to select a message with defined cache coherency states. That is, the described cache coherency protocol may use one message with a configurable cache coherency state request vector. The described cache coherency protocol may therefore simplify the integrated circuit and/or hardware by not having to use multiple messages. The cache coherency protocol may provide a systematic and uniform method for handling cache coherency in a cache hierarchy.

To describe some implementations in greater detail, reference is first made to examples of hardware and software structures used to implement a system including components that may transmit a request with a speculative request indicator. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 5-7.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
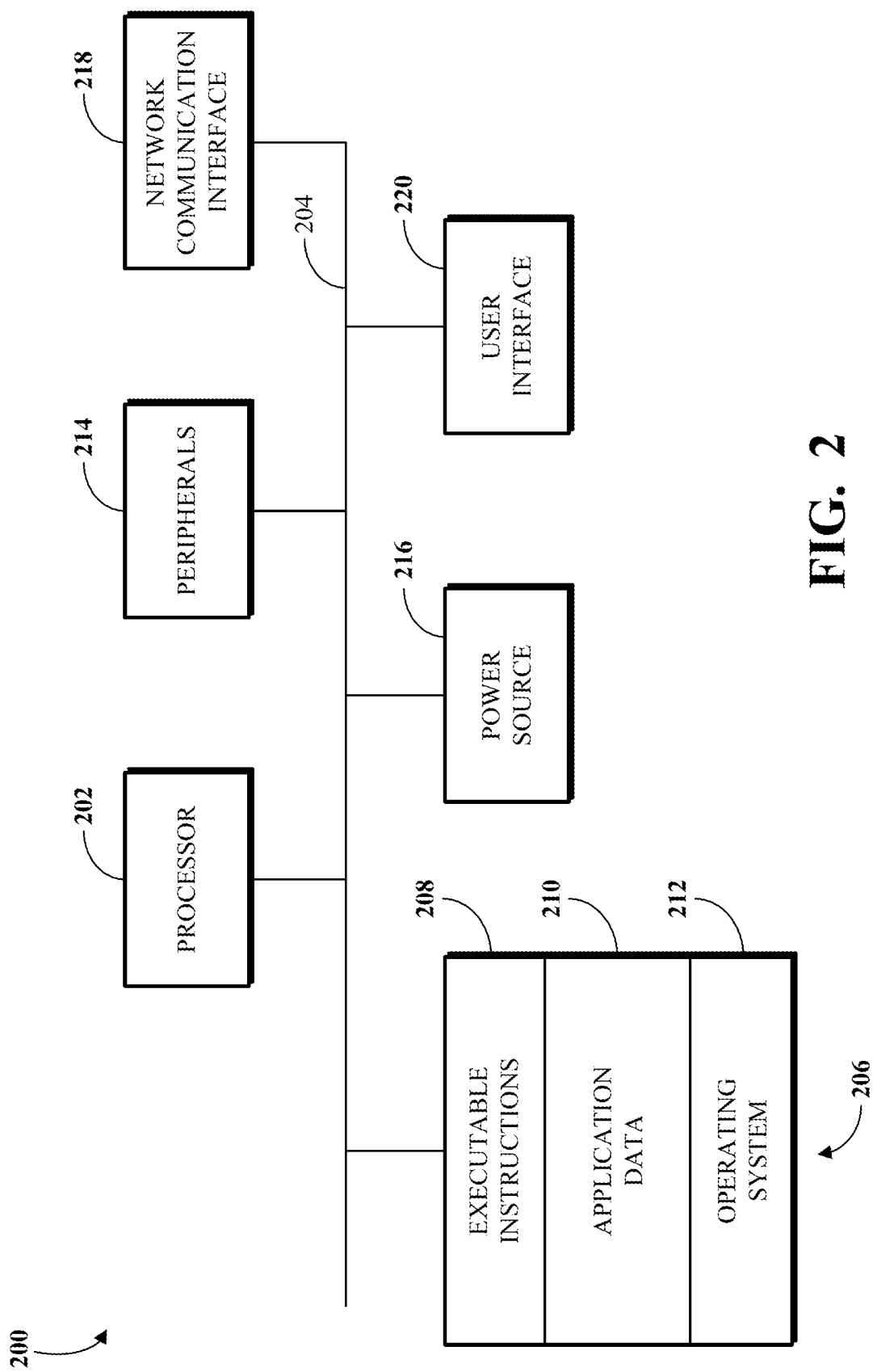
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 5-7.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information, and/or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
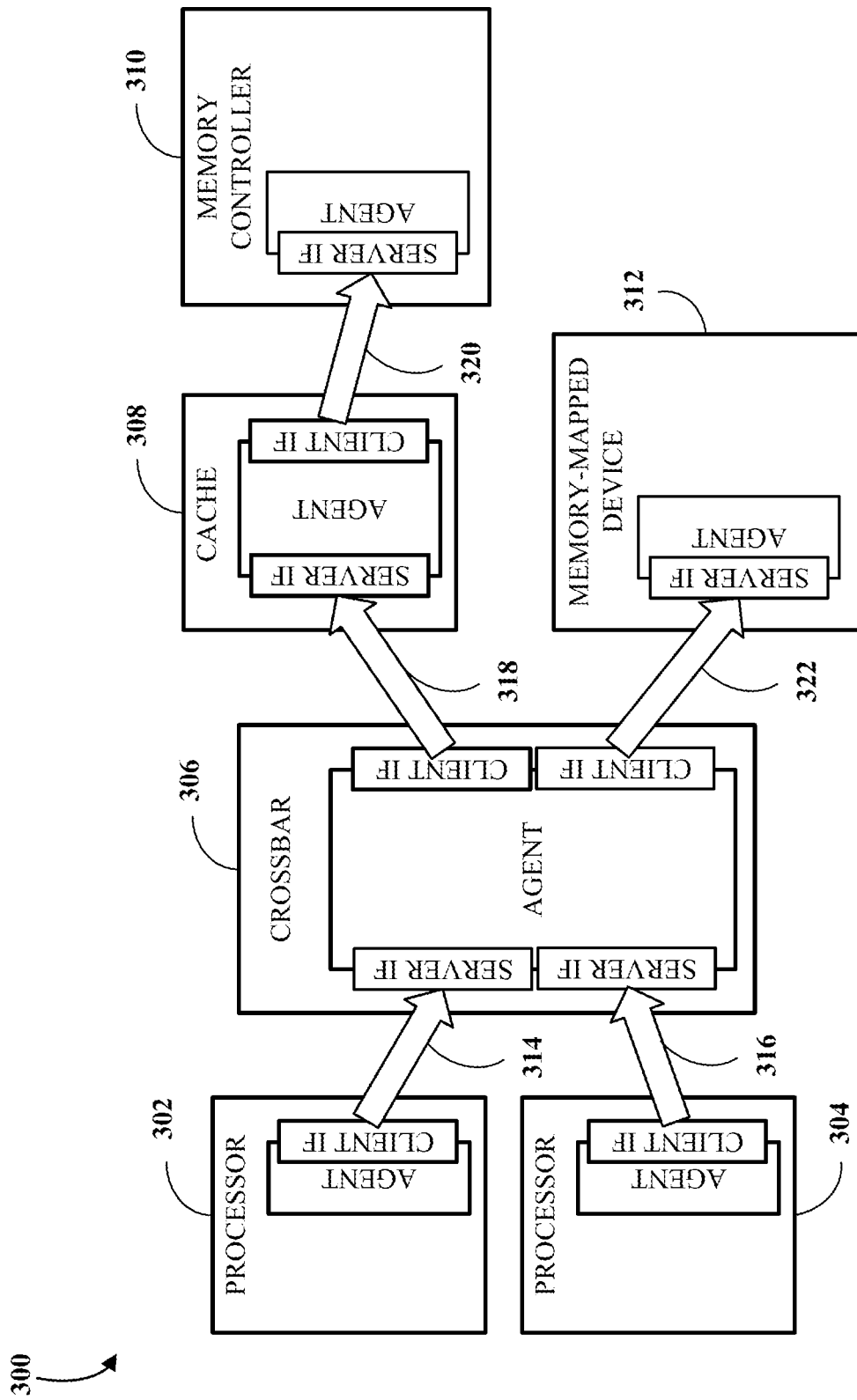
FIG. 3 is a block diagram of an example of a system including agents, implemented by components, that may transmit a request with a cache coherency state request vector.

FIG. 3 is a block diagram of an example of a system 300 including components that may transmit a request with a speculative request indicator. The system 300 could be implemented, for example, by an SoC. The components may include, for example, a first processor core 302, a second processor core 304, a cross bar 306, a cache 308 (e.g., a shared L2 cache, implementing a data storage such as an SRAM), a memory controller 310 (e.g., implementing a data storage such as a DRAM), and a memory-mapped device 312. The components may be connected so that data stored in cache blocks can be transferred between them while adhering to a cache coherency policy, such as one of the MSI, MESI, or MOESI policies. For example, the components can include agents that are connected to one another so that messages involving data can be transferred between them (e.g., sending and receiving) while adhering to the cache coherency policy. For example, the agents may be connected to one another using TileLink, a chip-scale interconnect standard that provides multiple masters and/or client devices with coherent memory mapped access to memory and/or slave or server devices.

The agents implemented by the components may implement point-to-point links for communicating the messages to one another. The messages may include, for example, requests (e.g., a request for data), responses (e.g., transferring or accessing the data), and acknowledgements. An agent may implement one or more master or client interfaces and/or one or more slave or server interfaces for communicating the messages. An agent with a client interface may request an agent with a server interface to perform memory operations, may request permission to transfer and cache copies of data (e.g., a cache block), may request permission to access data, and/or may request a change to one or more permissions of the data. An agent with a server interface may manage permissions and access to a range of addresses, including performing memory operations on behalf of requests arriving from a client interface. Thus, connected agents may send and receive messages over links to perform operations on shared address space.

For example, in the system 300, the first processor core 302 and the second processor core 304 may each include an agent having a client interface. The cross bar 306 may include an agent having a first server interface, a second server interface, a first client interface, and a second client interface (e.g., the cross bar 306 may be a server and a client, or a servent). The client interface of the first processor core 302 may connect to the first server interface of the cross bar 306 by a link 314. The client interface of the second processor core 304 may connect to the second server interface of the cross bar 306 by a link 316. The cache 308 may include an agent having a server interface and a client interface (e.g., the cache 308 may also be a servent). The first client interface of the cross bar 306 may connect to the server interface of the cache 308 by a link 318. The memory controller 310 may include an agent having a server interface. The client interface of the cache 308 may connect to the server interface of the memory controller 310 by a link 320. The memory-mapped device 312 may include an agent having a server interface. The second client interface of the cross bar 306 may connect to the server interface of the memory-mapped device 312 by a link 322. The agents implemented by the first processor core 302, the second processor core 304, the cross bar 306, the cache 308, the memory controller 310, and the memory-mapped device 312, may send and receive messages over their respective links, links 314, 316, 318, 320, and 322, to perform operations on shared address space.

Figure 4:
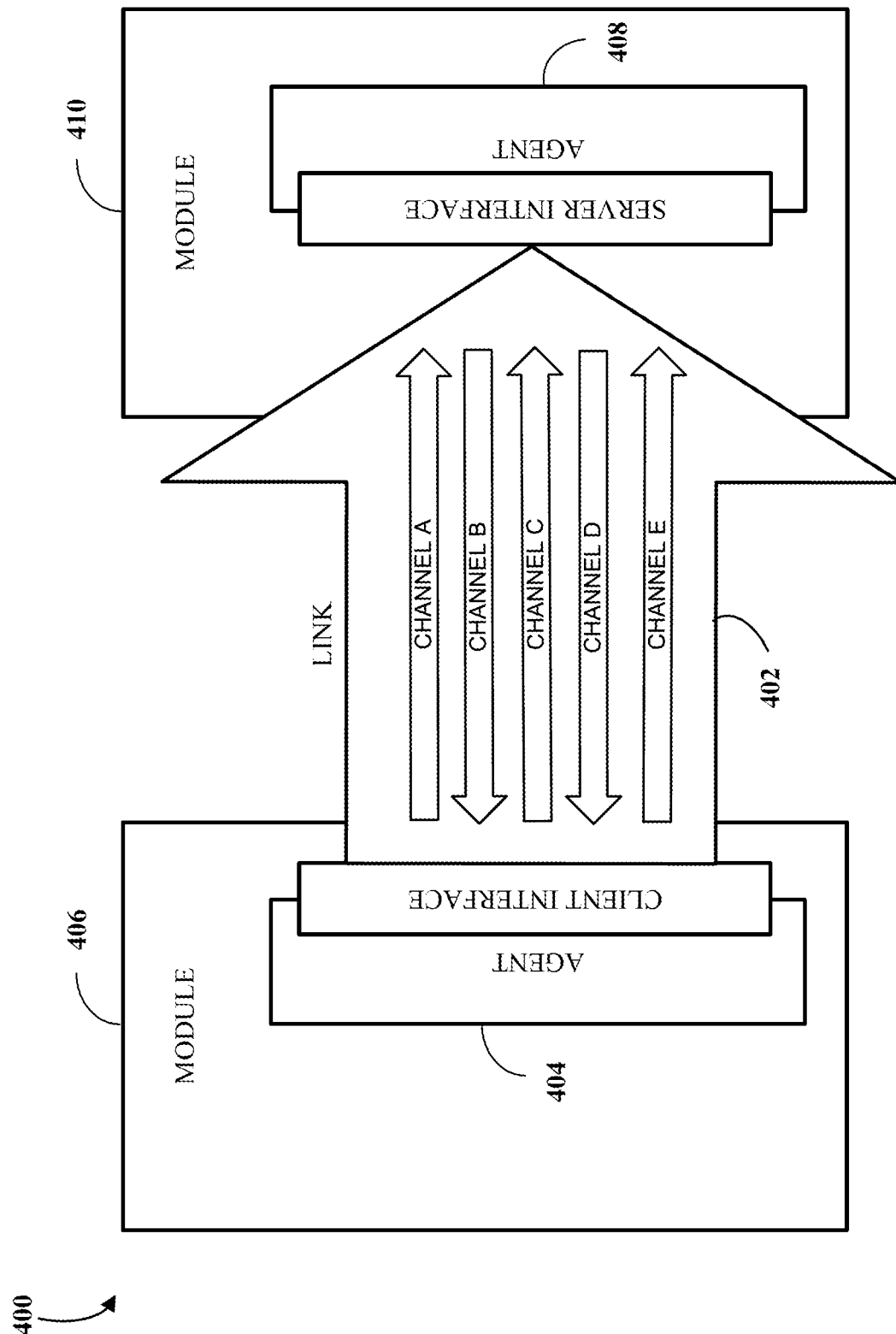
FIG. 4 is a block diagram of an example of a link between agents implemented by components.

FIG. 4 is a block diagram of an example of a link 402 between agents implemented by components and/or modules in a system, such as between an agent 404 implemented by a first component 406 and an agent 408 implemented by a second component 410. For example, the link 402 could be one of the links, 314, 316, 318, 320, or 322, shown in FIG. 3. The link 402 may be used to transmit a request with a speculative request indicator.

The agent 404 implemented by the first component 406 may include a client interface, and the agent 408 implemented by the second component 410 may include a server interface. For example, the first component 406 could be the first processor core 302, and the second component 410 could be the cross bar 306, the cache 308, or the memory controller 310. The client interface of the agent 404 may connect to the server interface of the agent 408 by the link 402. The connected agents 404 and 408 may send and receive messages to one another over point-to-point channels of the link 402, such as one of the Channel A through D implemented by the link 402. For example, the agents 404 and 408 may send and receive messages to perform operations on a shared address space. An operation may include, for example, a change to an address range's data values, permissions, or location in a memory hierarchy. A message may include a set of control and data values sent over a particular channel (e.g., one of the Channel A through D). The channels may be logically independent from one another for communicating the messages. A priority may be specified among the channels, such as a prioritization in which messages on Channel A have a lowest priority with messages on Channel E having a highest priority (e.g., a prioritization of channels A<B<C<D<E for messages across the channels). The channels may contain transaction control signals and a bus for exchanging data (e.g., a physical bus implemented by wires and having a particular data width, such as 128 bits). The channels may be directional, in that each channel may pass messages either from a client interface to a server interface or from a server interface to a client interface.

For example, Channel A may enable the agent having the client interface (e.g., the agent 404) to transmit a request to the agent having the server interface (e.g., the agent 408), such as a request that an operation be performed on a specified address range, such as accessing or caching data, or evicting data with a lower priority (e.g., a low priority evict). Channel B may enable the agent having the server interface (e.g., the agent 408) to transmit a request to the agent having the client interface (e.g., the agent 404), such as a request that an operation be performed at an address cached by a client (e.g., the agent 404), such as for accessing or writing back cached data or probing cached data (e.g., a probe). Channel C may enable the agent having the client interface (e.g., the agent 404) to transmit to the agent having the server interface (e.g., the agent 408) data, an acknowledgment message in response to the request, or evicting data with a higher priority (e.g., a high priority evict). Channel D may enable the agent having the server interface (e.g., the agent 408) to transmit a data response or acknowledgement message back to the client (e.g., the agent 404). Channel E may enable the agent having the client interface (e.g., the agent 404) to transmit back to the agent having the server interface (e.g., the agent 408) a final acknowledgment of a cache line or block transfer from the original requestor (e.g., the agent 404).

Figure 5:
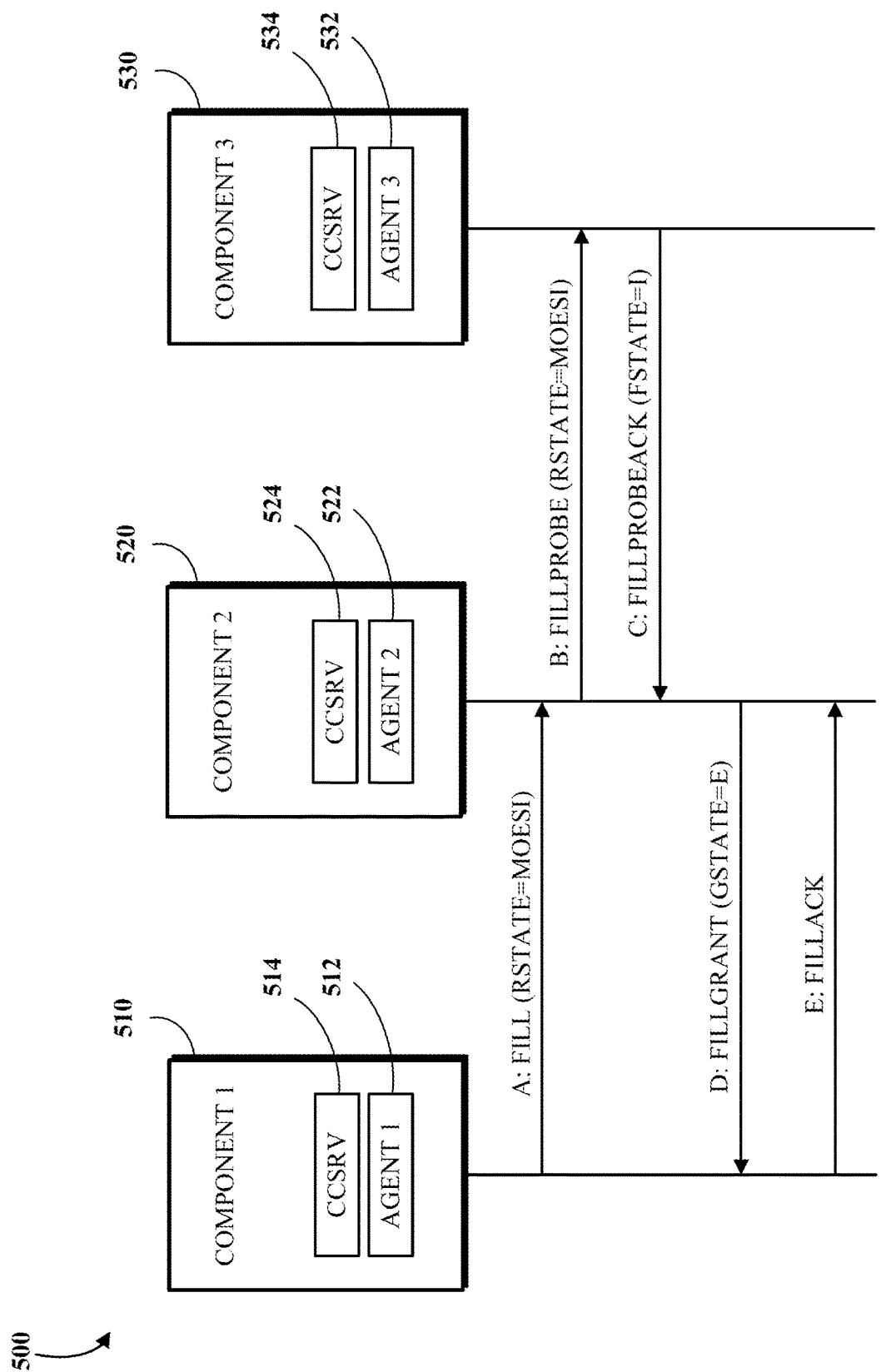
FIG. 5 is a block diagram of an example of a system including a client transmitting a request with a speculative request indicator and a server responding to the request.

FIG. 5 is a block diagram of an example of a system 500 including one or more components, such as a component 510, a component 520, and a component 530. Each of the components 510, 520, and 530 may be one of the processor core 302, the processor core 304, the cross bar 306, the cache 308, the memory controller 310, or the memory-mapped device 312 as shown in FIG. 3, as appropriate and applicable. Each of the components 510, 520, and 530 may be associated with or include an agent, such as an agent 1 512, an agent 2 522, and an agent 1 532. The agents 512, 522, and 524 could be agents like the agents shown in FIG. 3. The agents 512, 522, and 524 may each include circuitry for communicating with one another through a link. For example, the agents 512, 522, and 524 could communicate with one another through a link such as the link 314 shown in FIG. 3, which may be like the link 402 shown in FIG. 4. The agents 512, 522, and 524 could be implemented together in an integrated circuit, such as an SoC. The components 510, 520, and 530 and the associated agents 512, 522, and 524, respectively, may be a requestor or client, a responder or server, and/or a servent as described herein.

In implementations, the components 510, 520, and 530 and the associated agents 512, 522, and 524, respectively, may be used to execute transfer operations with respect to a demand request or a speculative request, which may move cache block(s) or cache block data, and/or permissions through a cache hierarchy. For example, the transfer operations may include a fill operation, a fillprobe operation, and/or other similar operations. Each transfer operation may include at least a request message and a response message. The request messages may specify or include a cache coherency state request vector (CCSRV), address of a cache block, size of the cache block, a data required flag, and other parameters.

In implementations, each of the component 510, the component 520, and the component 530 may maintain or include a CCSRV, such as a CCSRV 512, a CCSRV 522, and a CCSRV 532, as appropriate and applicable. The CCSRV may be a n-bit vector or field with each bit corresponding to a cache coherency state in a cache coherency protocol. That is, a bit position may represent a state in the cache coherency protocol. In some implementations, the CCSRV may be a 5-bit vector with each bit corresponding to one of the 5 MOESI states. A client (i.e., a requesting agent or requestor) may set one or more bits in the CCSRV that corresponds to one or more cache coherency states that the client will accept from a server (i.e., a responding agent or responder) in a response message to a request message. The CCSRV may provide what cache coherency states are legally permissible in the response message. That is, a requested cache coherency state specification may be encoded in the CCSRV field. An illustrative CCSRV is shown in Table 1:

TABLE 1

| BIT | 4 | 3 | 2 | 1 | 0 |
|---|---|---|---|---|---|
| STATE | I | M | O | E | S |

As stated, a client may set any bit that corresponds to a state that the client will accept in the response message to the request message. The request message may include a cache coherency response state (CCRS) that complies with the CCSRV in the request message. In implementations, each type of request message may have a different CCRS. That is, the fill operation may have a first type of CCRS and a fillprobe operation may have a second type of CCRS. In implementations, the first type of CCRS may be a grant state (gstate) field and the second type of CCRS may be a final state (fstate) field field plus an initial state (istate) field. The combination of the fstate and the istate in the CCRS communicates the changes in state to the requestor. In implementations, a state named in the gstate field is one of the states selected in the CCSRV sent in the request message. In implementations, if a request message for a fill operation receives a response message (i.e., a FillGrant response message) with a denied flag set (i.e., a transfer operation was not processed), the gstate field will indicate I cache coherency state. This may occur even if I was not specified as acceptable in the CCSRV of the original request message. In implementations, the CCRS is a m-bit field in accordance with the cache coherency protocol. For example, each state may be represented by a value. In another example, a bit position may represent a state.

In implementations, multiple bits in the CCSRV can be set for each request message. By setting multiple bits, the client can indicate that the client can support multiple outcomes. This may provide the server with some leeway in satisfying the request message. For example, a client that wishes to immediately service a Get operation to a cache block but expects future Put operations would set both the S and E bits. This would indicate that the client may make use of the Exclusive permission to write to the cache block if there are no other shared copies, but is not demanding a unique copy with the present request message.

The CCSRV may enable or permit a client to select any combination of cache coherency states. That is, for a n-bit CCSRV, there may be $n^2$ combinations. This enables interoperability between different types of clients which may use different types of cache coherency protocols. In implementations, one or more cache coherency protocols may constrain the number of legal vectors or combinations available in or for the CCSRV. In implementations, one or more cache coherency protocols may constrain the number of legal vectors or combinations available in or for the CCSRV for a given transfer operation and request message. For example, a fill operation and a fillprobe operation may have different legal vectors.

An illustrative example of legal vectors for a fill operation is shown in Table 2. Table 2 shows the legal vectors, a confidence level for the transfer operation or request message, the transfer operation, the expected state of the CCRS (e.g., a gstate for a fill operation), and a data cleanliness requirement for the cache block.

TABLE 2

| CCSRV VECTOR | CONFIDENCE | OPERATION | CCRS: ONE OF | DATA CLEANLINESS REQUIREMENT |
|---|---|---|---|---|
| --ES- | DEMAND | DEMAND LOAD WITH | E, S | DATA MUST BE GIVEN CLEAN |
| M-ES- | | SPECULATIVE STORE | M, E, S | DATA MAY BE GIVEN DIRTY ONLY IF UNIQUE |
| MOES- | | | M, O, E, S | DATA MAY BE GIVEN DIRTY |
| ---S- | | READ-ONLY LOAD OR GET | S | DATA MUST BE GIVEN CLEAN |
| -O-S- | | | O, S | DATA MAY BE GIVEN DIRTY |
| --E-- | | STORE, OUT, OR AMO | E | DATA MUST BE GIVEN CLEAN |
| M-E-- | | | M, E | DATA MAY BE GIVEN DIRTY |
| --ESI | SPECULATIVE | LOAD OR STORE | E, S, I | DATA MUST BE GIVEN CLEAN |
| M-ESI | | | M, E, S, I | DATA MAY BE GIVEN DIRTY ONLY IF UNIQUE |

TABLE 2-continued

| CCSRV VECTOR | CONFIDENCE | OPERATION | CCRS: ONE OF | DATA CLEANLINESS REQUIREMENT |
|---|---|---|---|---|
| MOESI | | | M, O, E, S, I | DATA MAY BE GIVEN DIRTY |
| ---SI | | READ-ONLY LOAD | S, I | DATA MUST BE GIVEN CLEAN |
| -O-SI | | | O, S, I | DATA MAY BE GIVEN DIRTY |
| --E-I | | STORE | E, I | DATA MUST BE GIVEN CLEAN |
| M-E-I | | | M, E, I | DATA MAY BE GIVEN DIRTY |

The first group of legal vectors in Table 2 (i.e., without the I state set) may be selected by a client in response to demand requests from a processor with respect to a cache block. A server will provide the cache block to the client using a response message (e.g., a FillGrant message for a fill operation) with one of the requested states in the CCRS (e.g., the gstate field for a fill operation).

The second group of legal vectors in Table 2 (i.e., with the I state set) may be selected by a client in response to speculative requests from a processor. This group may be identified herein as the speculative request indicator. In these instances, a response message with a CCRS with a I state is a legal vector for each corresponding demand legal vector. Setting the I bit in the CCSRV denotes the operation speculative in the sense that the client has authorized the server to not provide any increase in permissions if other clients are using the block. The I bit does not carry information about the likelihood that returning the speculatively requested permissions will be useful. If a client is dissatisfied with a response state that the client previously allowed, the client may issue another request message with a more specific and stringent set of CCSRV bits set (e.g., the same request but without the I state set). In implementations, a speculative request (i.e., with the I state set) may receive a denied response. In implementations, the denied response to the speculative request does not affect the behavior of the system 500. However, the client may treat the denied response as an error.

In implementations, one or more cache coherency protocols may reserve certain vectors based on a variety of factors. That is, the certain vectors may be illegal vectors. Table 3 is an illustrative example of reserved vectors or encodings:

TABLE 3

| CCSRV VECTOR | REASONS FOR RESERVED VECTOR |
|---|---|
| ----- | NOTHING REQUESTED |
| ----I | |
| -O--- | O WITHOUT S (CLIENT THAT SUPPORTS |
| -O--I | REPLICATED/DIRTY SHOULD SUPPORT |
| -OE-- | REPLICATED/CLEAN) |
| -OE-I | |
| MOE-- | |
| MOE-I | |
| MO-S- | M WITHOUT E (CLIENT THAT SUPPORTS |
| MO-SI | UNIQUE/DIRTY SHOULD SUPPORT |
| M---- | UNIQUE/CLEAN) |
| M---I | |
| M-S- | |
| M--SI | |
| MO---I | |
| -OES- | O AND E WITHOUT M (CLIENT THAT |

TABLE 3-continued

| CCSRV VECTOR | REASONS FOR RESERVED VECTOR |
|---|---|
| -OESI | SUPPORTS REPLICATED/DIRTY AND UNIQUE/CLEAN SHOULD SUPPORT UNIQUE/DIRTY) |

An operational example is described with respect to FIG. 5. In this example, the component 1 510 and the agent 1 512 may be a client, the component 1 520 and the agent 1 522 may be a server, and the component 1 530 and the agent 1 532 may be another client. The agent 1 512 may send a speculative request message for a fill operation to the agent 2 522 (over a channel A), where the CCSRV 514 is set to "MOESI". The request message for the fill operation may trigger a fillprobe operation. In this instance, the agent 2 522 may send a request message for a fillprobe operation to the agent 3 532 (over a channel B), where the CCSRV 524 is set to "MOESI". Here, the request message for the triggered fillprobe operation may copy the CCSRV sent in the request message for the fill operation. The agent 3 532 may send a response message (i.e., an acknowledgement message) for the fillprobe operation to the agent 2 522 (over a channel C), where the CCSRV 534 is set to an "I" state. Given that the fstate=I, the agent 3 532 is not retaining any permissions (i.e., it is now invalid) and the agent 2 522 may grant as much permissions as it wants to agent 1 512. This means that the Agent 2 522 may provide any of the cache coherency states identified in the CCSRV 514. The agent 2 522 may send a response message (i.e., a fillgrant message) for the fill operation to the agent 1 512 (over a channel D), where the CCSRV 524 is set to "E" (signifying most flexibility or control by the component 1 510 with respect to the cache block). The agent 1 512 may send a response message (i.e., an acknowledgement message) for the fill probe operation to the agent 2 522 (over a channel E), completing the fill operation for the speculative request. In some implementations, the agent 2 522 knowing that the request was speculative, may apply different processing priority to the request including, for example, not processing the request. In these instances, the response may indicate a denial of service, setting of an invalid cache state, and/or other mechanisms to indicate non-processing of the request. The prioritization may be based on, for example, load, level of speculation of the request, and/or other factors.

Figure 6:
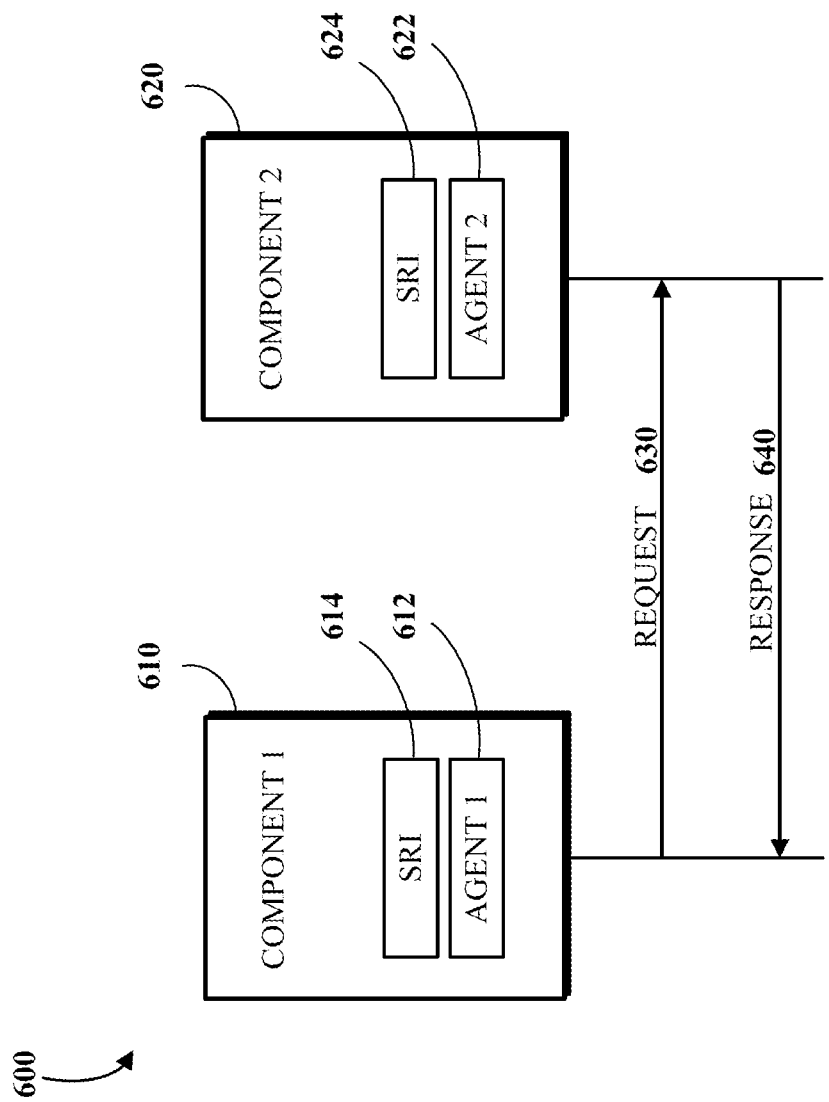
FIG. 6 is a block diagram of an example of a system including a client transmitting a request with a speculative request indicator and processing thereof.

FIG. 6 is a block diagram of an example of a system 600 including one or more components, such as a component 610 and a component 620. Each of the components 610 and 620 may be one of the processor core 302, the processor core 304, the cross bar 306, the cache 308, the memory controller 310, or the memory-mapped device 312 as shown in FIG. 3, as appropriate and applicable. Each of the components 610 and 620 may be associated with or include an agent, such as an agent 1 612 and an agent 1 632. The agents 612 and 622 could be agents like the agents shown in FIG. 3, agents used in other bus fabrics and interconnect technologies which provide, for example, interfacing capabilities and/or other mechanisms. The agents 612 and 622 may each include circuitry for communicating with one another through a link. For example, the agents 612 and 622 could communicate with one another through a link such as the link 314 shown in FIG. 3, which may be like the link 402 shown in FIG. 4. The agents 612 and 622 could be implemented together in an integrated circuit, such as an SoC. The components 610 and 620 and the associated agents 612 and 622, respectively, may be a requestor or client, a responder or server, and/or a servent as described herein.

In implementations, a cache coherency protocol or messaging protocol may be used with the system 600, the components 610 and 620, and the associated agents 612 and 622, respectively, to transmit or provide a speculative request indicator in a request message as to whether the request message is for a demand request or a speculative request. In implementations, a component and/or agent, such as the components 610 and 620 and/or agents 612 and 622, may include or use a speculative request indicator (SRI) 614 and 624, respectively, to indicate whether a request is a demand request or a speculative request. The components 610 and 620, the associated agents 612 and 622, and the SRI 614 and 624, respectively, may be used to execute transfer operations with respect to the demand request or the speculative request, which may move cache block(s) or cache block data, and/or permissions through a cache hierarchy. For example, the transfer operations may include a fill operation, a fillprobe operation, and/or other similar operations. Each transfer operation may include at least a request message and a response message to execute the operations.

In some implementations, the cache coherency protocol or messaging protocol may include or use a limited set of cache coherency messages, where each cache coherency message may be defined for or with one or more cache coherency state(s). In this instance, the cache coherency protocol or messaging protocol is limited in the sense that not all possible combinations of cache coherency states are represented in the limited set of cache coherency messages. In some implementations, the limited set of cache coherency messages may be referred to as demand cache coherency messages. The SRI, such as the SRI 614 and 624, may refer to a second limited set of cache coherency messages which includes an invalid cache coherency state in addition to the cache coherency states already defined in each of the cache coherency messages in the limited set of cache coherency messages. The second limited set of cache coherency messages may also be referred to as speculative cache coherency messages. This enables a client to select an appropriate cache coherency message from the demand cache coherency messages or the speculative cache coherency messages depending on whether the request is a demand request or a speculative request, where the selected message may include the appropriate cache coherency state(s) required by the request.

In some implementations, the cache coherency protocol or messaging protocol may include or use a limited set of cache coherency messages, where each cache coherency message may be defined for or with one or more cache coherency state(s). In this instance, the cache coherency protocol or messaging protocol is limited in the sense that not all possible combinations of cache coherency states are represented in the limited set of cache coherency messages. The SRI, such as the SRI 614 and 624, may refer to a flag, a mask bit, or another mechanism which may be selected to designate that the request message is for a speculative request. This enables a client to select an appropriate cache coherency message from the limited set of cache coherency messages and then designate whether the request is a demand request or a speculative request.

In some implementations, the cache coherency protocol or messaging protocol may use the CCSRV as described herein with respect to FIGS. 1-5.

An operational example is described with respect to FIG. 6. In this example, the component 1 610 and/or the agent 1 612 may be a client and the component 2 620 and the agent 2 622 may be a server. The agent 1 612 may send a request message for a fill operation to the agent 2 622 (630). In this instance, an incoming request from a processor may be a speculative request. Accordingly, a SRI may be used or selected. In some implementations, a bit for an invalid cache coherency state in a CCSRV may be selected. In some implementations, one or more other bits may be set for one or more other cache coherency states. In some implementations, a cache coherency message from speculative cache coherency messages may be selected which is reflective of the speculative request. In some implementations, a cache coherency message from a limited set of cache coherency messages may be selected which is reflective of the speculative request and a bit may be selected to indicate that the incoming request is a speculative request. The agent 2 622 may send a response message to the agent 1 612 in response to the request message (640). In some instances, since the agent 2 622 knows that the request was speculative, different priority may be given to processing the request including, for example, not processing the request. In these instances, the response may indicate a denial of service, setting of an invalid cache state, and/or other mechanisms to indicate non-processing of the request. The prioritization may be based on, for example, load, level of speculation of the request, and/or other factors.

Figure 7:
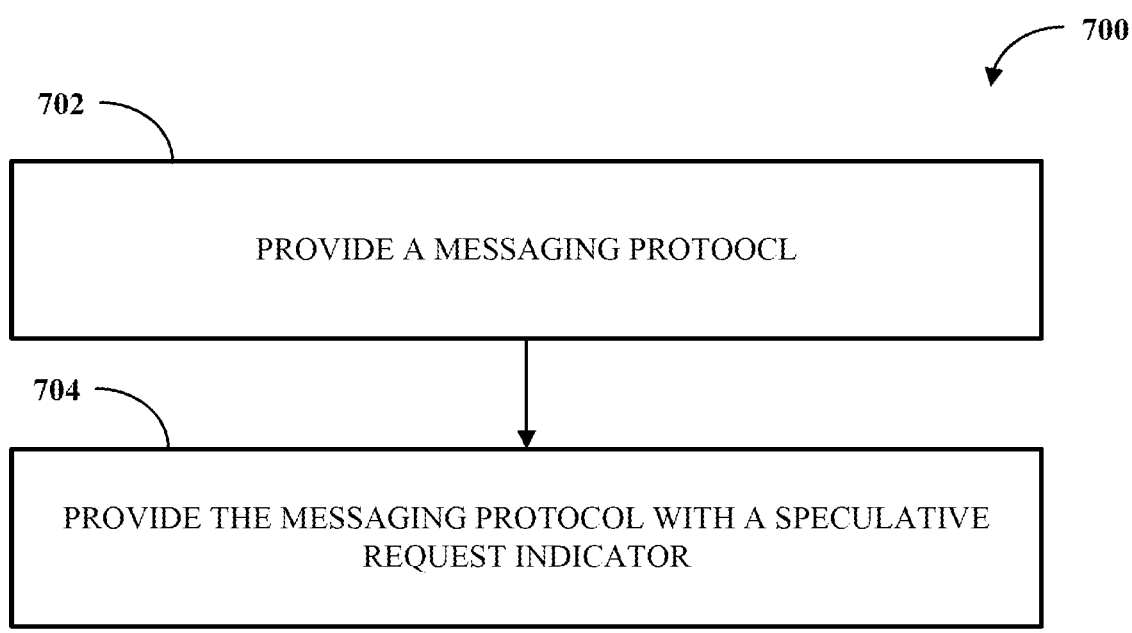
FIG. 7 is a flow chart of an example of a technique for transmitting a request with a speculative request indicator.

To further describe some implementations in greater detail, reference is next made to examples of techniques which may be performed by or using a system for transmitting a request with a SRI. FIG. 7 is a flow chart of an example of a technique 700 for transmitting a request with a SRI. The technique 700 can be executed using computing devices, such as the systems, hardware, and software described with respect to FIGS. 1-6. For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, a messaging protocol may be provided for a cache hierarchy. The messaging protocol may be used for executing transfer operations among agents in the cache hierarchy. Request messages in the messaging protocol may indicate acceptable cache coherency states for a cache block indicated in the request message. In some implementations, the messaging protocol may include or use a limited set of cache coherency messages. The limited cache coherency messages may be defined for or with one or more cache coherency state(s). In this instance, the cache coherency protocol or messaging protocol is limited in the sense that not all possible combinations of cache coherency states are represented in the limited set of cache coherency messages. In some implementations, the messaging protocol may be or may use a request message including a configurable or selectable CCSRV, which may enable an agent to select one or more bits indicative of acceptable cache coherency states when responding to the request message.

At 704, the messaging protocol may be provided with a selectable speculative request indicator. The speculative request indicator may be selected by an agent when sending the request message. The speculative request indicator may differentiate between a demand request and a speculative request with respect to the cache block. In some implementations, the speculative request indicator may be a second limited set of cache coherency messages which are duplicative of the limited set of cache coherency messages but additionally include selection of an invalid cache coherency state. Accordingly, one of the second limited set of cache coherency messages may be selected when the request is a speculative request. In some implementations, the speculative request indicator may be a flag or mask bit. The flag or mask bit may be selected in addition to one of the limited set of cache coherency messages. The selected flag or mask bit may indicate that the request is a speculative request. In implementations, the configurable or selectable CCSRV may enable or include demand request configurations and speculative request configurations, where the speculative request configurations are duplicative of the demand request configurations but with the provision or inclusion of selecting an invalid cache state. The bit indicating the invalid cache coherency state and one or more bits reflective of the incoming request may be selected in the CCSRV when the request is a speculative request.

Some implementations may include a method providing, for a cache hierarchy, a messaging protocol used for transfer operations among agents in the cache hierarchy, the messaging protocol indicating acceptable cache coherency states for a cache block indicated in a request message and providing, in the messaging protocol for selection by an agent, a speculative request indicator when sending the request message, wherein the speculative request indicator differentiates between a demand request and a speculative request with respect to the cache block. In some implementations, the method further includes transmitting, by the agent to another agent, the request message for the cache block, the request message including selection of the speculative request indicator and receiving, by the agent from the another agent, a response message with an invalid state responsive to the selection of the speculative request indicator in the request message. In some implementations, selection of the speculative request indicator enables a response from another agent to include an invalid state. In some implementations, selection of the speculative request indicator in the request message for the cache block enables another agent to not service the request message. In some implementations, selection of the speculative request indicator in the request message for the cache block enables another agent to prioritize processing of the request message based on a variety of factors. In some implementations, the messaging protocol includes a first set of request messages with acceptable cache coherency states, wherein the speculative request indicator is a second set of messages which are a duplicate of the first set of messages, the second set of messages including an invalid state in addition to the acceptable cache coherency states, and wherein the first set of messages are associated with the demand request and the second set of messages are associated with the speculative request. In some implementations, the messaging protocol includes a set of request messages with acceptable cache states and the speculative request indicator is a flag bit to indicate when a request message being transmitted is for a speculative request. In some implementations, the messaging protocol includes a set of request messages with acceptable cache states and the speculative request indicator is a mask bit to indicate when a request message being transmitted is for a speculative request. In some implementations, the messaging protocol includes a cache coherency state request vector, wherein a selected bit in the cache coherency state request vector indicates an acceptable cache coherency state for the cache block indicated in the request message, and wherein selection of the speculative request indicator includes at least selecting a bit for an invalid state. In some implementations, the messaging protocol includes a cache coherency state request vector, wherein a selected bit in the cache coherency state request vector indicates an acceptable cache coherency state for the cache block indicated in the request message, wherein the cache coherency state request vector includes demand configurations and speculative configurations, and wherein selection of the speculative request indicator refers to use of one of the speculative configurations.

Some implementations may include an apparatus including a messaging protocol for use by agents in a cache hierarchy to enable data operations, wherein the messaging protocol indicates acceptable cache coherency states for data indicated in a request message, and wherein the messaging protocol provides for selection by an agent, a speculative request indicator when sending the request message, the speculative request indicator differentiating between a demand request and a speculative request with respect to the data. In some implementations, the apparatus further comprising the agent configured to transmit to another agent, the request message for the data, the request message including selection of the speculative request indicator and receive from the another agent, a response message with an invalid state responsive to the selection of the speculative request indicator in the request message. In some implementations, selection of the speculative request indicator enables a response from another agent to include an invalid state. In some implementations, selection of the speculative request indicator in the request message for the cache block enables another agent to not service the request message. In some implementations, selection of the speculative request indicator in the request message for the cache block enables another agent to prioritize processing of the request message based on a variety of factors. In some implementations, the messaging protocol includes a first set of request messages with acceptable cache coherency states, wherein the speculative request indicator is a second set of messages which are a duplicate of the first set of messages, the second set of messages including an invalid state in addition to the acceptable cache coherency states, and wherein the first set of messages are associated with the demand request and the second set of messages are associated with the speculative request. In some implementations, the messaging protocol includes a set of request messages with acceptable cache states and the speculative request indicator is a flag bit to indicate when a request message being transmitted is for a speculative request. In some implementations, the messaging protocol includes a set of request messages with acceptable cache states and the speculative request indicator is a mask bit to indicate when a request message being transmitted is for a speculative request. In some implementations, the messaging protocol includes a cache coherency state request vector, wherein a selected bit in the cache coherency state request vector indicates an acceptable cache coherency state for the cache block indicated in the request message, and wherein selection of the speculative request indicator includes at least selecting a bit for an invalid state. In some implementations, the messaging protocol includes a cache coherency state request vector, wherein a selected bit in the cache coherency state request vector indicates an acceptable cache coherency state for the cache block indicated in the request message, wherein the cache coherency state request vector includes demand configurations and speculative configurations, and wherein selection of the speculative request indicator refers to use of one of the speculative configurations.

Some implementations may include a non-transitory computer readable medium comprising a circuit representation that, when processed by a computer, is used to program or manufacture an integrated circuit including a messaging protocol for use by agents in a cache hierarchy to enable data operations, wherein the messaging protocol indicates acceptable cache coherency states for data indicated in a request message, and wherein the messaging protocol provides for selection by an agent, a speculative request indicator when sending the request message, the speculative request indicator differentiating between a demand request and a speculative request with respect to the data. In some implementations, the circuit representation, when processed by the computer, is used to program or manufacture the integrated circuit with the messaging protocol, wherein the agent is configured to transmit to another agent, the request message for the data, the request message including selection of the speculative request indicator and receive from the another agent, a response message with an invalid state responsive to the selection of the speculative request indicator in the request message. In some implementations, selection of the speculative request indicator enables a response from another agent to include an invalid state. In some implementations, selection of the speculative request indicator in the request message for the cache block enables another agent to not service the request message. In some implementations, selection of the speculative request indicator in the request message for the cache block enables another agent to prioritize processing of the request message based on a variety of factors. In some implementations, the messaging protocol includes a first set of request messages with acceptable cache coherency states, wherein the speculative request indicator is a second set of messages which are a duplicate of the first set of messages, the second set of messages including an invalid state in addition to the acceptable cache coherency states, and wherein the first set of messages are associated with the demand request and the second set of messages are associated with the speculative request. In some implementations, the messaging protocol includes a set of request messages with acceptable cache states and the speculative request indicator is a flag bit to indicate when a request message being transmitted is for a speculative request. In some implementations, the messaging protocol includes a set of request messages with acceptable cache states and the speculative request indicator is a mask bit to indicate when a request message being transmitted is for a speculative request. In some implementations, the messaging protocol includes a cache coherency state request vector, wherein a selected bit in the cache coherency state request vector indicates an acceptable cache coherency state for the cache block indicated in the request message, and wherein selection of the speculative request indicator includes at least selecting a bit for an invalid state. In some implementations, the messaging protocol includes a cache coherency state request vector, wherein a selected bit in the cache coherency state request vector indicates an acceptable cache coherency state for the cache block indicated in the request message, wherein the cache coherency state request vector includes demand configurations and speculative configurations, and wherein selection of the speculative request indicator refers to use of one of the speculative configurations.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method comprising:
   providing, for a cache hierarchy, a messaging protocol used for transfer operations among agents in the cache hierarchy, the messaging protocol indicating acceptable cache coherency states for a cache block indicated in a request message; and
   providing, in the messaging protocol for selection by an agent, a speculative request indicator when sending the request message, wherein the speculative request indicator differentiates between a demand request and a speculative request with respect to the cache block, wherein selection of the speculative request indicator includes at least selecting a bit for an invalid state.

2. The method of claim 1, the method further comprising:
   transmitting, by the agent to another agent, the request message for the cache block, the request message including selection of the speculative request indicator; and
   receiving, by the agent from the another agent, a response message with an invalid state responsive to the selection of the speculative request indicator in the request message.

3. The method of claim 1, wherein selection of the speculative request indicator enables a response from another agent to include an invalid state.

4. The method of claim 1, wherein selection of the speculative request indicator in the request message for the cache block enables another agent to not service the request message.

5. The method of claim 1, wherein selection of the speculative request indicator in the request message for the cache block enables another agent to prioritize processing of the request message based on a variety of factors.

6. The method of claim 1, wherein the messaging protocol includes a first set of request messages with the acceptable cache coherency states, wherein the speculative request indicator is a second set of messages which are a duplicate of the first set of messages, the second set of messages including an invalid state in addition to the acceptable cache coherency states, and wherein the first set of messages are associated with the demand request and the second set of messages are associated with the speculative request.

7. The method of claim 1, wherein the messaging protocol includes a set of request messages with the acceptable cache coherency states and the speculative request indicator is a flag bit to indicate when a request message being transmitted is for a speculative request.

8. The method of claim 1, wherein the messaging protocol includes a set of request messages with the acceptable cache coherency states and the speculative request indicator is a mask bit to indicate when a request message being transmitted is for a speculative request.

9. The method of claim 1, wherein the messaging protocol includes a cache coherency state request vector, wherein a selected bit in the cache coherency state request vector indicates an acceptable cache coherency state for the cache block indicated in the request message.

10. The method of claim 1, wherein the messaging protocol includes a cache coherency state request vector, wherein a selected bit in the cache coherency state request vector indicates an acceptable cache coherency state for the cache block indicated in the request message, wherein the cache coherency state request vector includes demand configurations and speculative configurations.

11. An apparatus comprising:
one or more processors; and
one or more memories storing instructions that, upon execution by the one or more processors, configure the apparatus to:
provide a messaging protocol for use by agents in a cache hierarchy to enable data operations,
wherein the messaging protocol indicates acceptable cache coherency states for data indicated in a request message,
wherein the messaging protocol provides for selection by an agent, a speculative request indicator when sending the request message, the speculative request indicator differentiating between a demand request and a speculative request with respect to the data, and
wherein selection of the speculative request indicator refers to use of one of speculative configurations of the messaging protocol.

12. The apparatus of claim 11, wherein the agent configured to:
transmit to another agent, the request message for the data, the request message including selection of the speculative request indicator; and
receive from the another agent, a response message with an invalid state responsive to the selection of the speculative request indicator in the request message.

13. The apparatus of claim 11, wherein the selection of the speculative request indicator enables a response from another agent to include an invalid state.

14. The apparatus of claim 11, wherein the selection of the speculative request indicator in the request message for a cache block enables another agent to not service the request message.

15. The apparatus of claim 11, wherein the selection of the speculative request indicator in the request message for a cache block enables another agent to prioritize processing of the request message based on a variety of factors.

16. The apparatus of claim 11, wherein the messaging protocol includes a first set of request messages with the acceptable cache coherency states, wherein the speculative request indicator is a second set of messages which are a duplicate of the first set of messages, the second set of messages including an invalid state in addition to the acceptable cache coherency states, and wherein the first set of messages are associated with the demand request and the second set of messages are associated with the speculative request.

17. The apparatus of claim 11, wherein the messaging protocol includes a set of request messages with the acceptable cache coherency states and the speculative request indicator is a flag bit to indicate when a request message being transmitted is for a speculative request.

18. The apparatus of claim 11, wherein the messaging protocol includes a set of request messages with the acceptable coherency cache states and the speculative request indicator is a mask bit to indicate when a request message being transmitted is for a speculative request.

19. The apparatus of claim 11, wherein the messaging protocol includes a cache coherency state request vector, wherein a selected bit in the cache coherency state request vector indicates an acceptable cache coherency state for a cache block indicated in the request message.

20. The apparatus of claim 11, wherein the messaging protocol includes a cache coherency state request vector, wherein a selected bit in the cache coherency state request vector indicates an acceptable cache coherency state for a cache block indicated in the request message, wherein the cache coherency state request vector includes demand configurations and speculative configurations.

21. A non-transitory computer readable medium storing instructions that, upon execution by one or more processors, cause operations comprising:
providing a messaging protocol for use by agents in a cache hierarchy to enable data operations,
wherein the messaging protocol indicates acceptable cache coherency states for data indicated in a request message and includes a first set of request messages with the acceptable cache coherency states,
wherein the messaging protocol provides for selection by an agent, a speculative request indicator when sending the request message, the speculative request indicator differentiating between a demand request and a speculative request with respect to the data,
wherein the speculative request indicator includes a second set of messages which are a duplicate of the first set of messages, the second set of messages including an invalid state in addition to the acceptable cache coherency states, and
wherein the first set of messages are associated with the demand request and the second set of messages are associated with the speculative request.

* * * * *